3,350,437
ORGANOMERCAPTOMETHYL SILICON COMPOUNDS AND PRODUCTION THEREOF
Walter Simmler, Cologne-Muhlheim, Hans Niederprum, Monheim, and Heinz Jonas, Leverkusen-Bayerwerk, Germany, assignors to Farbenfabriken Bayer Aktiengesellschaft, Leverkusen, Germany, a German corporation
No Drawing. Filed Dec. 11, 1963, Ser. No. 329,875
Claims priority, application Germany, Dec. 31, 1962, F 38,688
6 Claims. (Cl. 260—448.2)

ABSTRACT OF THE DISCLOSURE

Some novel organomercapto-methyl silicon compounds are disclosed together with a method of preparing the same. The novel compounds are organosilicon thioether derivatives and contain as an essential structural unit a

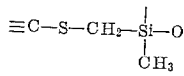

group. The process involves reacting a halomethyl silicon compound at a temperature between 10 and 120° C. with a mono- or polyvalent H-S-C compound in the presence of a lower alcohol as solvent and a base, the latter being employed in an amount at least stoichiometrically equivalent to the halogen content of the halomethyl silicon compund. The novel compounds are useful per se as interface-active agents, as lubricants, etc.

---

The invention is concerned with a process for the production of organosilicon thioether derivatives which contain as essential structural unit the group

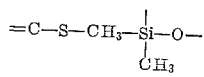

These substituted thioethers can be monmeric silane derivatives or siloxanes, the siloxane units of which may otherwise be selected in known manner from mono-, di- and trifunctional alkyl siloxane and aryl siloxane units. These siloxanes have the composition $R_nSiO_{4-n/2}$, with numerical values of $n$ between 1 and 3, and with the proviso that at least one of the substituents R is an organomercaptomethyl radical and all the other radicals R are alkyl or aryl radicals which may also be indifferently substituted.

As derivatives of polyfunctional mercaptans carrying two functional groups in adjacent positions, six-membered heterocycles which are, for example, 2-sila- and 2,6-disila-1,4-oxathiane derivatives, belong likewise to the thioethers to be produced according to the invention.

The thioether derivatives mentioned above have hitherto been obtained either from chloromethyl silicon compounds by reaction with metal mercaptides or, according to a more recent process which is not part of the state of the art, from bromomethyl silicon compounds by reaction with mercaptans in the presence of a tertiary amine; in this process the reaction mixture can be maintained, if necessary, in a mobile state by the addition of an inert solvent such as benzene.

It has now been found that a number of advantages are attained by carrying out the reaction of the halomethyl silicon compounds with the use of a lower alcohol as solvent. In contrast to reaction mixtures to which no solvent has been added or a hydrocarbon as diluent has been added, it is now possible to react within a sufficiently short time in a lower alcohol not only bromomethyl silicon compounds but also chloromethyl silicon compounds with H-S-C compounds. Also in the last-mentioned case it is therefore no longer necessary to use metal mercaptides which involve additional expenditure and give only poor yields. In the new process the behavior of the two halogen compounds differs only in that the reaction of the bromine compounds proceeds quite rapidly already at room temperature whereas the chlorine compounds necessitate higher temperatures in order to attain the same reaction speed. In both cases the temperatures are substantially lower than those required without alcohol under otherwise identical conditions; yet the reactions proceed more rapidly. This results not only in an immediate economic advantage but also in a milder treatment of the reaction products.

It has further been found that in the alcoholic medium not only tertiary amines are suitable for binding the resulting hydrogen halide, but also the inexpensive alkali metal hydroxides. That means that the desired reaction leading to compounds with the grouping $\equiv$Si—CH$_2$—S—$\equiv$ is accelerated by the method according to the invention to such an extent that, surprisingly, the reactions which would otherwise have to be expected are overtaken by this reaction. It is known that alkali metal hydroxide normally splits the chloromethyl silicon compounds at the Si—C bond according to $\equiv$Si—CH$_2$Cl+KOH→$\equiv$Si—O—K+CH$_3$Cl, and the bromomethyl silicon compounds, as described at another place, are either decomposed, e.g. in a tetrahydrofuran solution, likewise with separation of the Si—C bond, into methanol and methoxy silicon compounds, possibly also into their hydrolysis and condensation products, or they are hydrolyzed, namely in a methanol or ethanol solution, to give the analogous hydroxymethyl silicon compounds in addition to alkali metal bromide.

When using a tertiary nitrogen base for binding the hydrogen halide, it is further known that in the presence of an alcohol there are obtained the corresponding ethers, i.e. alkoxymethyl silicon compounds, besides the hydrobromic acid salt of the nitrogen base. All these undesirable reactions are practically absent, if the reaction components are dissolved in an aliphatic alcohol, preferably ethanol, while avoiding increasing the temperature more than is necessary for a smooth course of the reaction leading to the thioether derivatives.

The object of the invention, therefore, is a process for the production of organomercaptomethyl silicon compounds, characterized in that (1) a halomethyl silicon compound in which the halogen can be chlorine or bromine and which can be (a) an organopolysiloxane of the general formula $R_nSiO_{4-n/2}$ with a numerical value of $n$ between 1 and 3, wherein at least one of the siloxane units has the formula halogen-CH$_2$—Si(CH$_3$)$_m$—O$_{3-m/2}$, $m$ being equal to 1 or 2, and otherwise each R denotes a optionally indifferently substituted alkyl or aryl radical, or (b) a halomethyl silane of the general formula halogen-CH$_2$—Si(CH$_3$)$_m$—(OR')$_{3-m}$, $m$ being equal to 1 or 2, wherein R' denotes a lower alkyl radical, is reacted at a temperature between 10 and 120° C. with (2) a mono- or polyvalent H-S-C compound which can be an alkyl mercaptan, a thiophenol, a mono- or polyhydroxylated alkyl mercaptan or a mercaptocarboxylic acid, in the presence (3) of a lower alkanol as solvent, and a base (4) the amount of which is stoichiometrically at least equivalent to the halogen content of the halomethyl silicon compound, and which can be an alkali metal hydroxide or a tertiary nitrogen base.

The organopolysiloxanes to be reacted range from those in which one chloromethyl or bromomethyl radical is linked with each silicon atom, such as e.g. in the 1,3-di(halomethyl)tetramethyl disiloxanes, to linear or branched polysiloxanes, e.g. methyl or phenylmethyl polysiloxanes in which the halomethyl radicals are only present at the terminal siloxane units halogen-$CH_2$—$Si(CH_3)_2$—$O_{1/2}$. In other cases the siloxanes may contain the halomethyl radical in lateral position, e.g. in the form of bifunctional siloxane units of the formula halogen-$CH_2$—$Si(CH_3)$—O.

Examples of H-S-C compounds which provide the thioether bridge of the products to be prepared according to the invention are: n-butyl mercaptan, thiophenol, β-hydroxyethyl mercaptan, 1-mercapto-2,3-dihydroxypropane or thioglycollic acid.

Suitable bases for binding the hydrogen halide split off are, for example, triethylamine and 1,2-bis-(dimethylamino)-ethane as tertiary nitrogen bases, as well as sodium and potassium hydroxide.

The simplest way of carrying out the process consists in mixing the three reagents in an alcoholic solution. In the case of stronger exothermal reactions it is advisable to dissolve first the halomethyl silicon compound (1) in a part of the alcohol (3) and then to add gradually the H-S-C compound (2) and the base (4) dissolved together in the remaining portion of the alcohol (3), whereby it is advantageous to use an indicator such as phenolphthalein. This gradual admixing in accordance with the progress of the reaction is especially recommended if the process is carried out with a chloromethyl silicon compound in the hot and in the presence of an alkali metal hydroxide, since in this case the risk must already be taken into account that the chloromethyl radicals may be split off from the silicon in the presence of a substantial excess of alkali.

It is also possible to prepare first an alcoholic solution of the silicon compound and the sulphur compound, and to add gradually an alcoholic solution of the base alone. In those cases where the mercapto compound is obtained during its production in an aqueous solution together with an alkali metal hydroxide, its isolation is not necessary. Completely satisfactory results are obtained, for example, by using butanol as lower alkanol in the process according to the invention and continuously distilling off the water azeotropically with butanol during the gradual addition of the aqueous solution.

The organomercaptomethyl silicon compounds produced according to the invention are to be used as interface-active agents, as lubricants, and as intermediate products for synthetic resins, for example for the production of polyurethanes.

The following examples are given for the purpose of illustrating the invention.

*Example 1*

1 litre of ethanol is mixed with 1080 g. of a methylbromomethyl polysiloxane having a bromine content of 11.1 percent by weight and the approximate composition.

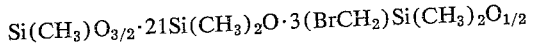

A solution of 182 g. of thiophenol (10% excess) and 96 g. of potassium hydroxide (87.8 percent by weight KOH=1.5 mol) in 500 cc. of ethanol is added dropwise to this mixture at room temperature in the course of 4 hours. The reaction mixture is stirred at room temperature for a further hour, then heated at 50° C. for 2 hours and allowed to stand overnight. After the addition of a few drops of phenolphthalein, carbon dioxide is introduced until the color changes. The precipitated salt is separated by filtration. It contains 94% of the bromine used as determined by bromide titration.

The filtrate is heated at 100° C. and a pressure of between 1 and 2 mm. Hg, the residue is filtered through kieselghur, and 1040 g. of ω,ω',ω''-tris-(phenyl-mercaptomethyl)-polymethyl siloxane are obtained as a clear, slightly yellowish oil of refractive index $n_D^{20}$=1.4490, containing 38.05 percent by weight of C, 4.5 percent by weight of S (calculated for $C_{70}H_{168}O_{24}S_3Si_{25}$: 38.4% by weight of C, 4.4% by weight of S).

*Example 2*

500 cc. of ethanol are mixed with 522 g. of a phenylmethyl-bromomethyl polysiloxane having a bromine content of 11.5 percent by weight and the approximate composition

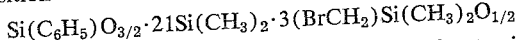

A solution of 83 g. of thiophenol and 48 g. of potassium hydroxide in 500 cc. of ethanol is added dropwise to this mixture at room temperature in the course of 4 hours, and the reaction mixture is further treated as described in Example 1.

415 g. of a yellowish oil are eventually obtained having refractive index $n_D^{20}$=1.4505, a sulphur content of 4.6 percent by weight (calculated: 4.25) and a structure of the formula

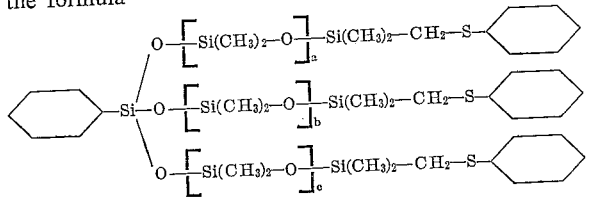

wherein the numerical values of a, b and c are about 7 and their sum total amounts to 21.

*Example 3*

200 cc. of ethanol are mixed with 150 g. of a methylbromomethyl polysiloxane having a bromine content of 14.6 percent by weight and the approximate composition

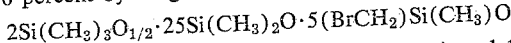

A solution of 33 g. of thiophenol (10% excess) and 17.5 g. of potassium hydroxide in 300 cc. of ethanol is added dropwise to this mixture at room temperature in the course of 4 hours, and the reaction mixture is further treated as described in Example 1. Bromide titration of the salt precipitated during the reaction yields 91% of the bromine used.

152 g. of phenylmercaptomethyl-substituted α,ω-bis-(trimethylsiloxy)-polymethyl siloxane are eventually obtained as a yellowish oil containing 39.5 percent by weight of carbon and 5.0 percent by weight of sulphur and having refractive index $n_D^{20}$=1.4585.

*Example 4*

500 cc. of ethanol are mixed with 74.4 g. of n-butylmercaptan (10% excess) and 540 g. of the methylbromomethyl polysiloxane used in Example 1, a solution of 48 g. of potassium hydroxide (0.75 mol) in 400 cc. of ethanol is added dropwise to this mixture at room temperature in the course of 4 hours, and the process is further carried out as described in Example 1. Bromide titration of the salt precipitated during the reaction yields 96% of the bromine used.

420 g. of ω,ω',ω''-tris-(n-butylmercaptomethyl)-polymethyl siloxane are obtained as a yellowish oil with refractive index $n_D^{20}$=1.4246, a carbon content of 35.3 percent by weight and a sulphur content of 4.5 percent by weight.

*Example 5*

200 cc. of ethanol are mixed with 160 g. of 1,3-di-(bromomethyl)-1,1,3,3-tetramethyl disiloxane, and a mixture of 108 g. of n-butylmercaptan (20% excess), 64 g. of potassium hydroxide and 500 cc. of ethanol is added thereto dropwise at 50° C. in the course of about 4 hours. The reaction mixture is stirred for a further 4 hours and the precipitated salt in which 97% of the bromine used can be titrated, is separated by filtration.

The filtrate no longer shows an alkaline reaction and is immediately distilled. 35 g. of 1,3-di-(n-butylmercaptomethyl)-1,1,3,3-tetramethyl disiloxane are obtained, which boils at 140° C. and 1 mm. Hg and the structure of which

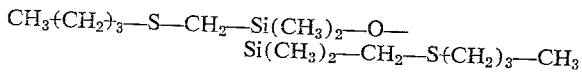

is confirmed by the infrared and nuclear resonance spectra.

Example 6

A solution of 115.5 g. (0.5 mol) of 1,3-di-(chloromethyl)-tetramethyl disiloxane, 110 g. (1 mol) of thiophenol and 122 g. of tirethylamine (20% excess) in 400 cc. of ethanol is heated at boiling temperature for 8 hours, and the mixture thus obtained is filtered. The ethanol is distilled off from the filtrate with continuous addition of toluene, and the residue is again filtered. Chloride titration of the filter residues yields a total of 89% of the chlorine used.

The filtrate is heated at 100° C. and at a pressure of between 1 and 2 mm. Hg, the residue is filtered through active charcoal, and 35 g. of 1,3-di-(phenylmercaptomethyl)-tetramethyl disiloxane are obtained as a yellowish oil with refractive index $n_D^{20}=1.5640$ and the structure

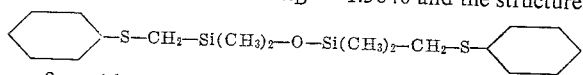

confirmed by the infrared spectrum.

Example 7

To a mixture of 375 g. (2 mol) of bromomethyldimethyl chlorosilane and 375 g. (2 mol) of methyl triethoxysilane there are added 400 cc. of anhydrous ethanol within 15 minutes, and subsequently a mixture of 400 cc. of ethanol and 36 g. (2 mol) of water within 2 hours with good stirring, and the mixture is then allowed to stand for several hours. The hydrogen chloride formed during the reaction and the bulk of ethanol are then driven off in a vacuum.

The residue essentially consists of 1,3,3-trimethyl-3-(bromomethyl)-1,1-diethoxy disiloxane. For carrying out the process according to the invention, it is mixed with 500 cc. of ethanol and 172 g. (2.2 mol) of β-hydroxyethyl mercaptan. A solution of 128 g. of potassium hydroxide (2 mol) in 500 cc. of ethanol is added dropwise in the course of 4 hours to the mixture which is allowed to stand overnight. It is then neutralized with gaseous carbon dioxide, the precipitated salt is separated by filtration and the filtrate is heated at up to 60° C. and at a pressure of between 1 and 2 mm. Hg. 332 g. of a viscous oil remain with a sulphur content of 15.3 percent by weight and a refractive index $n_D^{20}=1.4831$.

Example 8

A solution of 22.4 g. (0.4 mol) of anhydrous potassium hydroxide and 31.2 g. (0.4 mol) of β-hydroxymercapto ethanol in 150 cc. of ethanol is added dropwise at 50° C. in the course of 6 hours, while stirring, to a solution of 64 g. (0.2 mol) of 1,3-di(bromomethyl)-tetramethyl disiloxane in 200 cc. of ethanol. The precipitated potassium bromide is separated by filtration; it contains 96% of the bromine used.

The ethanol is removed from the filtrate at 30° C. in a vacuum, and as a yellowish, slightly oily residue with refractive index $n_D^{20}=1.4581$ there is obtained 1,3-di-(β-hydroxyethyl-mercaptomethyl)-tetramethyl disiloxane the hydroxyl content of which, as determined by the known isocyanate method, amounts to 11.1 percent by weight (calculated 10.8) and the structure of which is confirmed by nuclear magnetic resonance:

| Proportion of protons in | [HO— | CH₂— | CH₂— | S— | CH₂— | Si(CH₃)₂—]₂O |
|---|---|---|---|---|---|---|
| Calculated | 1 | 2 | 2 | | 2 | 6 |
| Found: | 0.9 | 2.0 | 2.0 | | 2.1 | 5.9 |
| Shift position (p.p.m.): | 4.6 | 3.72 | 2.65 | 1.85 | | 0.08 |

Example 9

1000 g. of a methylbromoethyl polysiloxane with a bromine content of 11.5 percent by weight and the approximate composition

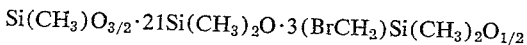

are dissolved in 1 litre of ethanol, and this solution is added in one portion at room temperature to a solution of 112.3 g. (1.437 mol) of β-hydroxyethylmercaptan and 80.5 g. (1.437 mol) of potassium hydroxide in 500 cc. of ethanol. The mixture which warms up to 48° C. within a few minutes is stirred without external heating for 2 hours and with heating at 50° C. for another 2 hours. The precipitated potassium bromide containing 96% of the bromine used is separated by filtration, the ethanol is distilled off from the filtrate and the residue blown out with nitrogen at 70° C. and 1 mm. Hg.

The residual ω,ω',ω''-tris-(β-hydroxyethylmercaptomethyl)-polymethyl siloxane of the approximate formula

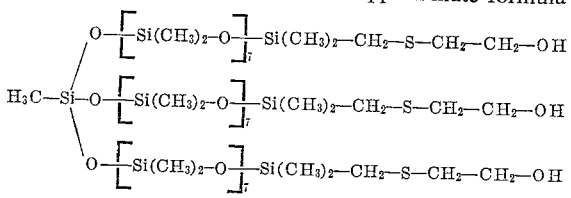

is a yellowish oil of viscosity 65 cst. at 20° C. and refractive index $n_D^{20}=1.4249$ containing 2.7 percent by weight of OH (calculated 2.5) and 4.3 percent by weight of S (calculated 4.6).

Example 10

A solution of 10 g. of a methylchloromethyl polysiloxane with a chlorine content of 4.7 percent by weight and the approximate composition

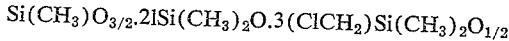

1.1 g. of β-hydroxyethylmercaptan and 0.75 g. of potassium hydroxide in 25 cc. of ethanol is heated at boiling temperature under reflux for 8 hours. The precipitated potassium chloride which contains 99% of the chlorine used is separated by filtration and the ethanol is blown out of the filtrate with nitrogen at 50° C. and 14 mm. Hg.

Essentially the same product as in Example 9 is obtained as an oil with refractive index $n_D^{20}=1.4245$.

Example 11

The potassium hydroxide used in Example 9 is replaced by the equimolar amount of triethylamine, using otherwise the same reaction components in the quantities stated therein. The whole mixture is heated at boiling temperature under reflux for 8 hours, the ethanol is then distilled off under atmospheric pressure while replacing it simultaneously by the continuous addition of toluene, until the toluene begins to distil, and the precipitated triethylamine salt is then separated by filtration. Bromide titration yields 94% of the theoretical amount.

The toluene is blown out of the filtrate with nitrogen at 90° C. and 15 mm. Hg.

Essentially the same product as in Examples 9 and 10 is obtained as an oil with viscosity 72 cst. at 20° C. and refractive index $n_D^{20}=1.4250$.

The nuclear magnetic resonance spectra of the products according to Examples 9, 10 and 11 shows the same grouping

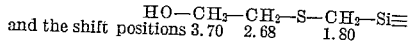

Example 12

1000 g. of a linear α,ω-di-(bromomethyl)-methyl polysiloxane having a bromine content of 15.85 percent by weight and the approximate formula

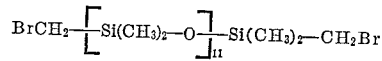

are dissolved in 1 litre of ethanol, a solution of 155 g. of β-hydroxyethylmercaptan and 111 g. of anhydrous potassium hydroxide in 500 cc. of ethanol is added dropwise at 50° C. in the course of 3 hours to this solution which is then further stirred at 50° C. for 3 hours. The precipitated potassium bromide containing 98% of the bromine used, is separated by filtration, and the filtrate further treated in the manner described in Example 9. An oil of viscosity 50 cst. at 20° C. and refractive index $n_D^{20}=1.4260$ is obtained.

Example 13

967 g. of a methylbromomethyl polysiloxane having a bromine content of 12.4 percent by weight and approximately the same composition as that used in Example 1 are dissolved in 1 liter of n-butanol. This solution which contains 1.5 gram atom of bromine is heated at boiling temperature under reflux, and 470 g. of a solution of 117 g. (1.5 mol) of β-hydroxy-ethylmercaptan, and 60 g. (1.5 mol) of sodium hydroxide in 293 g. of water are added thereto dropwise so slowly that the reaction mixture, when treated with phenolphthalein, remains colorless or acquires at most a pink color. Care is taken by the use of a water separator that the azeotropic mixture of butanol and water leaving the reflux condenser is simultaneously separated, the water continuously removed and the butanol reconducted into the reaction mixture. Under the aforesaid conditions the amount of aqueous solution added dropwise is 70 to 150 cc. per hour and the amount of removed water 30 to 60 cc. per hour.

When the reaction is terminated, an aqueous solution containing sodium bromide separates from the reaction mixture. This is removed and the residue is washed with 500 cc. of water. The removed solution and the wash water together contain 97.8% of the bromine used.

Any residual traces of alkali in the butanol solution of the reaction product are neutralized by introducing carbon dioxide, and the bulk of butanol is then distilled off under atmospheric pressure. The precipitated residues of carbonate and bromide are filtered off and the volatile portions are blown out from the filtrate with nitrogen at 100° C. and at 20 mm. Hg. There remains a yellowish oil of viscosity 52 cst. at 20° C. and refractive index $n_D^{20}=1.4237$ containing 2.5 percent by weight of OH and 4.1 percent by weight of S.

Example 14

800 cc. of ethanol are mixed with 171 g. of 1-mercapto-2,3-dihydroxypropane (5% excess) and 968 g. of the methylbromomethyl polysiloxane used in Example 1, a solution of 1.575 mol of potassium hydroxide in 800 cc. of ethanol is added dropwise at 50° C. in the course of 4 hours, the reaction mixture is stirred at 50° C. for a further 2 hours and allowed to stand overnight. It is then neutralized by introducing carbon dioxide and the precipitated salt, the bromide titration of which yields 98% of bromine used, is separated by filtration.

The filtrate is heated up to 100° C. in a vacuum of up to 2 mm. Hg, again filtered through sodium sulphate and kieselguhr, and as the last filtrate there are obtained 780 g. of a clear yellowish oil of refractive index $n_D^{20}=1.4336$ containing 4.5 percent by weight of OH and 4.6 percent by weight of S (calculated: 5.0 and 4.7 respectively).

Example 15

800 cc. of ethanol are mixed with 48.2 g. of 1-mercapto-2,3-dihydroxypropane (5% excess) and 695 g. of a linear α,ω-di-(bromomethyl)-methyl polysiloxane having a bromine content of 4.9 percent by weight and approximately corresponding to the formula $$BrCH_2 \left[ Si(CH_3)_2-O \right]_n Si(CH_3)_2-CH_2Br$$

a solution of 0.45 mol of potassium hydroxide in 400 cc. of ethanol is added dropwise at 50° C. in the course of 2 hours, and stirring is continued at 50° C. for another 2 hours.

The reaction mixture is further treated as described in Example 14, and as the last filtrate there are obtained 610 g. of a clear colorless oil of refractive index $n_D^{20}=1.4150$ containing 1.3 percent by weight of OH and 1.9 percent by weight of S.

Example 16

800 cc. of ethanol are mixed with 69 g. (0.75 mol) of methylthioglycollic acid and 540 g. (0.25 mol) of the methylbromomethyl polysiloxane used in Example 1, a solution of 1.5 mol of potassium hydroxide in 600 cc. of ethanol is added thereto in the course of 5 hours, the reaction mixture is stirred at 50° C. for a further 2 hours and then allowed to stand for several days. The salt precipitated during this time and containing 98% of the bromine used is separated by filtration, the filtrate is rendered neutral to methyl orange with dilute alcoholic hydrochloric acid, and the precipitated potassium chloride is again separated by filtration. The filtrate is concentrated by evaporation at up to 100° C. and at 1 mm. Hg and then filtered once more. As the last filtrate there are obtained 355 g. of a yellowish oil with refractive index $n_D^{20}=1.4252$ and a sulphur content of 4.1 percent by weight, corresponding to the formula

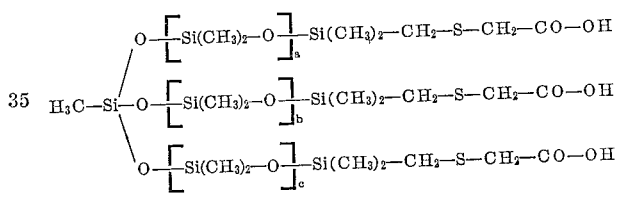

wherein the numerical values of a, b and c are about 7 and their sum total amounts to 21.

Example 17

40.4 g. (0.4 mol) of triethylamine are added in one portion to a solution of 64 g. (0.2 mol) of 1,3-di-(bromomethyl)tetramethyl disiloxane and 36.8 g. (0.4 mol) of thioglycollic acid in 200 cc. of ethanol, whereupon the mixture spontaneously warms up to 45° C. If it is allowed to stand at room temperature for 3 days, 80% of the bromine used will be found to be converted into bromide. By adding a further 20 g. of triethylamine, the amount of bromide is increased to a total of 97% of the bromine employed.

The last filtrate of the reaction solution is stirred with 3 litres of water and acidified with hydrochloric acid. 45 cc. of oil separate out which are taken up in ether and dried over sodium sulphate. The ether is blown out of this solution with nitrogen at 30° C. and at 20 mm. Hg, and 1,3-di-(carboxymethylmercaptomethyl)-tetramethyl disiloxane is obtained as a yellowish oil with refractive index $n_D^{20}=1.4437$.

What is claimed is:
1. Organopolysiloxane of the formula

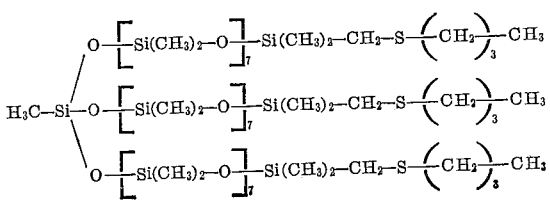

2. Organopolysiloxane of the formula

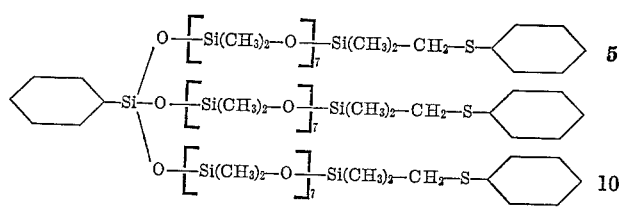

3. 1,3-di-(β - hydroxyethylmercaptomethyl) - 1,1,3,3-tetramethyl disiloxane.

4. Organopolysiloxane of the formula

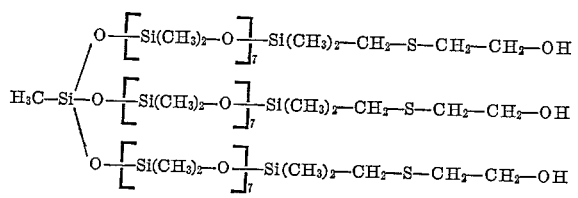

5. 1,3 - di - (carboxymethylmercaptomethyl) - 1,1,3,3-tetramethyl-disiloxane.

6. Organopolysiloxane of the formula

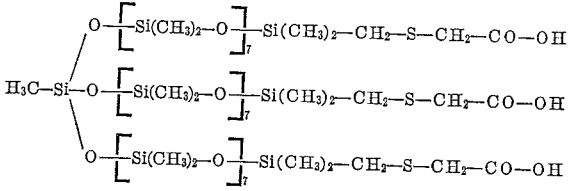

References Cited

UNITED STATES PATENTS

| | | | |
|---|---|---|---|
| 2,719,165 | 9/1955 | Cooper | 260—448.2 |
| 2,960,492 | 11/1960 | Morton et al. | 260—448.2 |
| 3,078,292 | 2/1963 | Prober | 260—448.2 |

OTHER REFERENCES

Cooper, J.A.C.S., 76, pages 3713–16, July 1959.

Derwent, Belgian Report, 81B, p. A1, No. 603,832, Sept. 18, 1961.

Simmler, "Ber." 96, pages 349–356, Jan. 21, 1963.

TOBIAS E. LEVOW, *Primary Examiner.*

P. F. SHAVER, *Assistant Examiner.*

UNITED STATES PATENT OFFICE
CERTIFICATE OF CORRECTION

Patent No. 3,350,437                      October 31, 1967

Walter Simmler et al.

It is hereby certified that error appears in the above numbered patent requiring correction and that the said Letters Patent should read as corrected below.

Column 1, lines 36 to 38, the formula should appear as shown below instead of as in the patent:

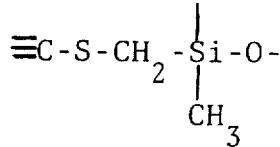

line 40, for "monmeric" read -- monomeric --; column 2, line 19, for "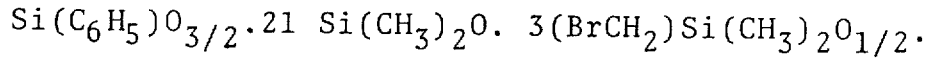" read -- ≡Si-CH$_2$-S-C≡ --; column 3, line 70, for "kieselghur" read -- kieselguhr --; column 4, lines 6 and 7, the formula should appear as shown below instead of as in the patent:

$$Si(C_6H_5)O_{3/2} \cdot 21\ Si(CH_3)_2O \cdot 3(BrCH_2)Si(CH_3)_2O_{1/2}.$$

column 5, line 12, for "tirethylamine" read -- triethylamine --; line 60, for "1,3-di(bromomethyl)-" read -- 1,3-di-(bromomethyl)- --; column 6, line 2, for "methylbromoethyl" read -- methylbromomethyl --.

Signed and sealed this 19th day of November 1968.

(SEAL)
Attest:

EDWARD M. FLETCHER, JR.
Attesting Officer

EDWARD J. BRENNER
                                   Commissioner of Patents